United States Patent
Maiya et al.

(10) Patent No.: US 9,059,908 B2
(45) Date of Patent: Jun. 16, 2015

(54) METHOD AND SYSTEM FOR FACILITATING NON-INTERRUPTIVE TRANSACTIONS

(75) Inventors: Rajashekara Visweswara Maiya, Bangalore (IN); Sachindran Kunjumpidukkal, Kannur Distt (IN); Manjunath Dindukurthi Viswanath, Chittoor Distt (IN)

(73) Assignee: INFOSYS LIMITED (IN)

(*) Notice: Subject to any disclaimer, the term of this patent is extended or adjusted under 35 U.S.C. 154(b) by 137 days.

(21) Appl. No.: 13/700,796

(22) PCT Filed: Dec. 1, 2010

(86) PCT No.: PCT/IN2010/000778
§ 371 (c)(1),
(2), (4) Date: Nov. 29, 2012

(87) PCT Pub. No.: WO2012/073248
PCT Pub. Date: Jun. 7, 2012

(65) Prior Publication Data
US 2013/0290407 A1    Oct. 31, 2013

(51) Int. Cl.
*H04L 12/26* (2006.01)
*G06Q 40/02* (2012.01)
*G06F 9/50* (2006.01)

(52) U.S. Cl.
CPC ............ *H04L 43/0805* (2013.01); *G06Q 40/02* (2013.01); *G06F 9/505* (2013.01)

(58) Field of Classification Search
CPC .... G06Q 40/02; H04L 43/0805; H04L 12/26; G06F 9/505
See application file for complete search history.

(56) References Cited

U.S. PATENT DOCUMENTS

| | | | |
|---|---|---|---|
| 6,859,834 B1* | 2/2005 | Arora et al. | 709/227 |
| 2002/0040402 A1* | 4/2002 | Levy-Abegnoli et al. | 709/229 |
| 2004/0139194 A1 | 7/2004 | Naganathan | |

(Continued)

FOREIGN PATENT DOCUMENTS

WO      0223434 A2      3/2002

OTHER PUBLICATIONS

International Search Report; International Application No. PCT/IN2010/000778; International Application Filing Date Dec. 1, 2010.

(Continued)

*Primary Examiner* — Ebrahim Golabbakhsh
(74) *Attorney, Agent, or Firm* — Cantor Colburn LLP

(57) ABSTRACT

A system, method and computer program product for facilitating non-interruptive transactions is provided, wherein the transactions are initiated at one or more transaction channels. The system comprises one or more transaction processing servers configured to perform transactions initiated at the transaction channels, each transaction processing server comprising predetermined logic for performing the initiated transactions. The system further comprises one or more monitors configured to monitor the availability of the transaction processing servers and forward the availability information to an integration module. The integration module is configured to forward the transactions initiated at the transaction channels to at least one transaction processing server based on the received availability information and predetermined criteria for forwarding transactions for processing to the transaction processing servers.

30 Claims, 4 Drawing Sheets

(56) References Cited

U.S. PATENT DOCUMENTS

2005/0138461 A1    6/2005  Allen
2008/0247320 A1   10/2008  Grah
2010/0070784 A1*   3/2010  Gupta et al. .................. 713/310

OTHER PUBLICATIONS

International Preliminary Report on Patentability (IPRP) for corresponding International Application No. PCT/IN2010/000778; International Application Filing Date Dec. 1, 2010, Mail Date Jun. 4, 2013.

* cited by examiner

METHOD AND SYSTEM FOR FACILITATING NON-INTERRUPTIVE TRANSACTIONS

FIELD OF THE INVENTION

The present invention relates generally to financial services. More specifically, the present invention relates to facilitating non-interruptive financial and non-financial transactions.

BACKGROUND OF THE INVENTION

Advancements in networking technologies have brought significant changes in the financial services industry. With constant evolution in data processing systems facilitated by technical advancements in computer systems and networking technologies, financial institutions such as, banks, ecommerce vendors etc., are able to provide real-time processing of various financial and non-financial transactions related to financial services.

The transactions are generally initiated at a Point of Sales (POS) such as an Automated Teller Machine (ATM), an ecommerce site etc. Thereafter, a transaction processing request is generated and forwarded to a dedicated transaction processing server via a network. The transaction processing server typically interacts with a repository maintained by the financial institution for processing the transactions. The repository stores customer information such as, name, account number, balance amount, transaction history etc. When a request is initiated, the server accesses the customer, information from the repository for processing the request. Real-time transactions are enabled by employing multiple servers and monitoring these servers. Various technologies assist in monitoring the servers by providing alerts to system managers, as and when faults are detected, which enables them in the provisioning of real-time transactions.

The abovementioned methodology, however, suffers from various disadvantages. The service availability depends primarily on the availability of the server and the network link between the POS and the transaction processing server. Further, usage of multiple servers leads to data redundancy, which in turn results in escalation of infrastructure costs. In addition, the processing of transactions remains subject to the availability of the network link between the POS and the servers. Further, the technologies that provide alerts to system managers fail to provide efficient means for processing transactions in the event of such failures.

Consequently, there is a need for an efficient system and method for facilitating non-interruptive transactions. Further, the system should enable efficient real-time processing of transactions. In addition, the system should enable optimal distribution of data for facilitating transactions.

SUMMARY OF THE INVENTION

A system, method and computer program product for facilitating non-interruptive transactions is provided. In various embodiments of the present invention, the transactions are initiated at one or more transaction channels.

In various embodiments of the present invention, the system comprises one or more transaction processing servers configured to perform transactions initiated at the transaction channels. Further each transaction processing server comprises predetermined logic for performing the initiated transactions. The system further comprises one or more monitors configured to monitor the availability of the transaction processing servers and forward the availability information to an integration module. The integration module is configured to forward the transactions initiated at the transaction channels to at least one transaction processing server based on the received availability information and predetermined criteria for forwarding transactions for processing to the transaction processing servers.

In an embodiment of the present invention, the system comprises an input module configured to collect inputs pertaining to initiation of transactions at the transaction channels of at least one branch. The input module comprises a client configured to render an interface for enabling the collection of inputs; and provide one or more web services via the rendered interface. The input module further comprises a web server configured to enable provisioning of the interface and the web services via the client.

In an embodiment of the present invention, the system comprises a Single Sign-On (SSO) framework configured to enable a single login id and password based access to a plurality of web services. The system further comprises a Signature Verification System (SVS) configured to enable validation of login credentials pertaining to predefined formats.

In various embodiments of the present invention, each transaction channel comprises at least one transaction initiation interface configured to collect inputs pertaining to initiation of transactions.

In an embodiment of the present invention, each transaction processing server is at least one of a Main Server configured to perform transactions initiated at the transaction channels; a Stand-In Server (SIS) configured to perform transactions initiated at the transaction channels in the absence of the Main Server; a Branch Server configured to handle transactions initiated at transaction channels of one or more branches in the absence of the Main Server and the SIS; and a Branch Stand-In Server (BSIS) configured to work in conjunction with the Branch Server and to process transactions initiated at the transaction channels of the one or more branches, in the absence of the Main Server and the SIS.

In an embodiment of the present invention, the Branch Server is further configured to forward transactions initiated at transaction channels of the one or more branches to at least one of the Main Server and the SIS. The transactions are forwarded if the at least one of the Main Server and the SIS is available for performing transactions.

In an embodiment of the present invention, the BSIS is a Flexible Stand-In Server (FSIS) configured to perform transactions initiated at transactions channels of a predetermined set of branches.

In another embodiment of the present invention, the BSIS is a Local Stand-In Server (LSIS) configured to perform transactions initiated at transactions channels of a branch.

In various embodiments of the present invention, each transaction processing server is associated with a repository configured to store transaction related information, the transaction processing server configured to interact with the repository for performing transactions.

In various embodiments of the present invention, each transaction processing server is configured to forward details of transactions performed at the transaction processing server to at least one other transaction processing server at predetermined time intervals based on predetermined criteria.

In an embodiment of the present invention, the integration module is configured to act as a middleware and provide a real-time interface between the transaction channels and the monitoring module and the transaction processing servers. The integration module is further configured to enable interaction between the transaction channels and the monitoring module and the transaction processing servers. The integration module comprises one or more listener processes and interfacing components for enabling interaction between the transaction channels and the monitoring module and the transaction processing servers. In an embodiment of the present invention, the system comprises a Multiple Asynchronous Request Interface Adaptor (MARIA) configured to manage the one or more listener processes. In another embodiment of the present invention, the system comprises a Switch Interface (SWIF) configured to act as an interfacing component between the transaction channels and the monitoring module and the transaction processing servers.

In various embodiments of the present invention, the monitoring module comprises one or more monitors, each monitor configured to monitor the availability of at least one transaction processing server and transmit the availability information to the integration module. In an embodiment of the present invention, each monitor is configured to listen to status change requests from the transaction processing server and forward the status change information to the integration module. Each monitor is further configured to monitor the availability of the transaction processing server at predetermined time intervals by sending predetermined messages to the transaction processing server. Each monitor is also configured to trigger initiation of a Store and Forward (SAF) replay process for synchronizing information between the transaction processing server and at least one other transaction processing server, the SAF replay process being initiated upon restoration of the network link between the corresponding transaction processing servers.

In an embodiment of the present invention, the one or more monitors comprise a Main Server monitor configured to monitor the availability of a Main Server; a Stand-In Server (SIS) monitor configured to monitor the availability of a SIS; and a Branch Server monitor configured to monitor the availability of a Branch Server.

In an embodiment of the present invention, the system for facilitating non-interruptive transactions comprises a plurality of transaction processing servers configured to perform transactions initiated at the transaction channels, each transaction processing server comprising predetermined logic for performing the initiated transactions. The plurality of transaction processing servers comprise one or more primary transaction processing servers configured to perform the initiated transactions based on predetermined criteria. The plurality of transaction processing servers also comprise one or more stand-in transaction processing servers, each stand-in transaction processing server configured to act as at least one primary transaction processing server in the absence of the corresponding transaction processing server. The system further comprises one or more monitors configured to monitor the availability of the transaction processing servers and forward the availability information to an integration module. In addition, the integration module is configured to forward the transactions to at least one transaction processing server based on the received availability information and predetermined criteria for forwarding requests to the transaction processing servers.

In various embodiments of the present invention, the method for facilitating non-interruptive transactions comprises receiving at least one transaction processing request from at least one transaction channel. The method further comprises tracking the availability of one or more primary transaction processing servers and one or more stand-in transaction processing servers. The method also comprises forwarding the transaction processing request to at least one transaction processing server based on the availability information and predetermined criteria for forwarding requests to the transaction processing servers.

In an embodiment of the present invention, the method comprises synchronizing the information of the one or more transaction processing servers based on predetermined criteria and the network link availability between the transaction processing servers.

In an embodiment of the present invention, the method for facilitating non-interruptive transactions comprises receiving at least one transaction processing request from at least one transaction channel. The method further comprises tracking the availability of a plurality of transaction processing servers, the plurality of transaction processing servers comprising a Main Server, a Stand-In Server (SIS), a Branch Server and a Branch Stand-In Server (BSIS). The method also comprises forwarding the transaction processing request to at least one transaction processing server based on the availability information and predetermined criteria for forwarding requests to the transaction processing servers. In an embodiment of the present invention, the transaction processing request is forwarded for processing to the Main Server, if it is available; the SIS, if the Main Server is not available; and the Branch Server, if the Main Server and the SIS are not available, wherein the Branch Server works in conjunction with the BSIS for processing the request. In an embodiment of the present invention, the availability of the transaction processing servers is tracked by one or more monitors. In addition, the transaction processing request is automatically forwarded to at least one transaction processing server by at least one of a Switch Interface and a branch application module. The transaction processing request is forwarded based on the information gathered from the monitors and the predetermined criteria for forwarding requests.

In various embodiments of the present invention, the computer program product for facilitating non-interruptive transactions comprises program instruction means for receiving at least one transaction processing request from at least one transaction channel. The computer program product further comprises program instruction means for tracking the availability of one or more primary transaction processing servers and one or more stand-in transaction processing servers. The computer program product also comprises program instruction means for forwarding the transaction processing request to at least one transaction processing server based on the availability information and predetermined criteria for forwarding requests to the transaction processing servers.

In an embodiment of the present invention, the computer program product further comprises program instruction means for synchronizing the information of the one or more transaction processing servers based on predetermined criteria and the network link availability between the transaction processing servers.

In an embodiment of the present invention, the computer program product for facilitating non-interruptive transactions comprises program instruction means for receiving at least one transaction processing request from at least one transaction channel. The computer program product further comprises program instruction means for tracking the availability of a plurality of transaction processing servers, the plurality of transaction processing servers comprising a Main Server, a Stand-In Server (SIS), a Branch Server and a Branch Stand-In Server (BSIS). The computer program product also comprises program instruction means for forwarding the transaction processing request to at least one transaction processing server based on the availability information and predetermined criteria for forwarding requests to the transaction processing servers. In an embodiment of the present invention, the computer program product further comprises program instruction means for forwarding the transaction processing request for processing to the Main Server, if it is available; the SIS, if the Main Server is not available; and the Branch Server, if the Main. Server and the SIS are not available, wherein the Branch Server works in conjunction with the BSIS for processing the request.

In an embodiment of the present invention, the computer program product further comprises program instruction means for tracking the availability of the transaction processing servers via one or more monitors. The computer program product further comprises program instruction means for automatically forwarding the transaction processing request to at least one transaction processing server by at least one of a Switch Interface and a branch application module. The transaction processing request is forwarded based on the information gathered from the monitors and the predetermined criteria for forwarding requests.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

The present invention provides a system and method for facilitating various non-interruptive transactions related to financial services. The method comprises initiating a transaction at a Point of Sale (POS) such as, an Automated Teller Machine (ATM), an e-banking site, a bank counter, a shopping/ecommerce site etc. The method further comprises forwarding a request, for processing, to a transaction processing server selected from one or more transaction processing servers. The determination of the transaction processing server to which the request is to be forwarded is based on data collected from a set of monitors, which monitor the status of the transaction processing servers at a predetermined frequency. Subsequently, the transaction is processed at the corresponding transaction processing server and the transaction details are recorded in an associated repository. Thereafter, the transaction details are forwarded to repositories of other transaction processing servers in a predetermined manner, based on availability of the transaction processing servers.

The disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
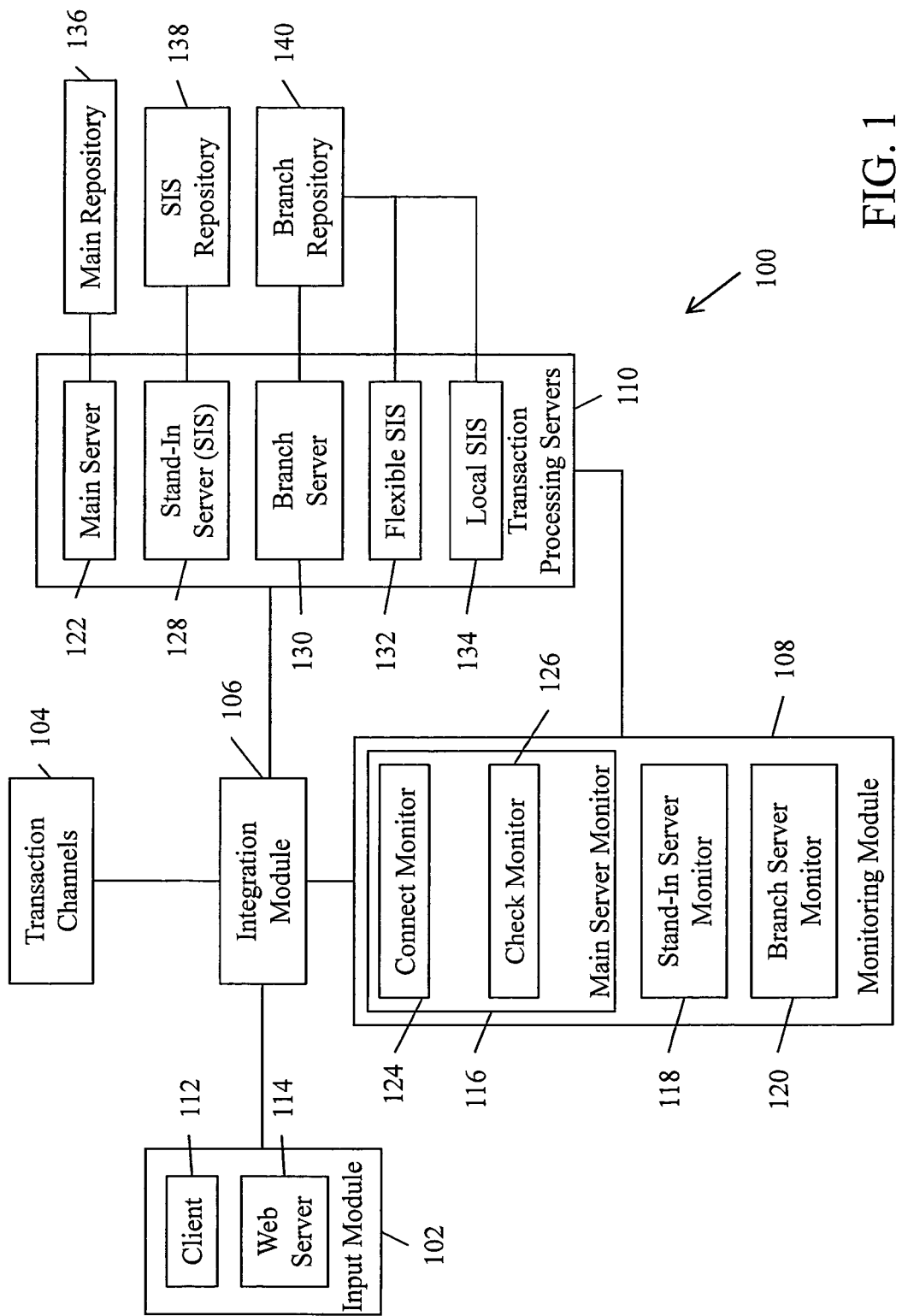
FIG. 1 illustrates a block diagram of a system for facilitating non-interruptive transactions, in accordance with an, embodiment of the present invention.

FIG. 1 illustrates a block diagram of a system for facilitating non-interruptive transactions, in accordance with an embodiment of the present invention. System 100 comprises an input module 102, transaction channels 104, an integration module 106, a monitoring module 108, transaction processing servers 110, a main repository 136, a Stand-In Server (SIS) repository 138 and a branch repository 140.

In various embodiments of the present invention, system 100 facilitates various financial and non-financial transactions, related to various financial services. Examples of financial transactions include, but are not limited to, cheque/cash withdrawals, deposits, transfers, payments made for purchase of goods/services and online transfers. Examples of non-financial transactions include, but are not limited to, account balance checks, updates, mini statement of accounts, new customer account creation and modifying existing customer account information. These transactions may be performed at one of, but not limited to, banks; internet banking portals; portals provided by online service providers working along with banks such as online travel agency portals, insurance service portals and shopping portals. In other words, the transactions may be performed at various locations that permit performing various transactions related to financial services.

The transactions are initiated at transaction channels 104. In various embodiments of the present invention, transaction channels 104 are online/offline sources of accessing various financial services. In other words, transaction channels 104 are distribution channels that provide branch/branchless banking and non-banking services. Examples of transactions channels 104 include Automated Teller Machines (ATMs), treasury applications, tele-banking applications, call center channels, e-banking applications etc. In an embodiment of the present invention, the transactions are initiated at interfaces of transaction channels 104 such as bank counters, ATM interfaces, and interfaces of Point of Sales (POS) etc.

In an embodiment of the present invention, transaction channels 104 comprise an integrator and a treasury. The integrator is a J2EE Application, which acts as an application gateway between external systems, applications or products and various applications of system 100 providing financial transactions, wherein the access to the applications is enabled via an online interface. In an exemplary embodiment of the present invention, one or more value-added service applications, such as Customer Relationship Management (CRM), e-banking, customer analytics are provided through the integrator. The treasury is a system that provides support for trading, management and administration of various financial market products, which comprise front, middle and back office products of a treasury division in a bank.

Transactions may also be initiated by accessing browser based applications of transaction channels 104. In an embodiment of the present invention, browser based applications of transaction channels 104 can be accessed through input module 102 using one or more web services. Input module 102 is configured to provide an interface such as, a portal or a web page, for accessing the web services provided by one or more bank branches. The access to various web services is enabled via one or more clients 112 through a web server 114 of input module 102. Examples of clients may include data processing devices used by customers or by internal employees of banking services providers. Web server 114 delivers web pages related to banking services to client 112.

In an embodiment of the present invention, web server 114 comprises a Single Sign-On (SSO) framework and a Signature Verification System (SVS) for authenticating users. The SSO framework enables validation of login credentials of users and subsequent access to multiple applications through a single login id and password. Further, the SSO framework enables browser level integration of various applications i.e. the SSO framework enables access to differently rendered applications via a single interface. In an exemplary embodiment of the present invention, the SSO framework is configured to provide a single time authentication for accessing various financial and non-financial services such as core banking, Customer Relationship Management etc. The SVS is configured to validate credentials such as, signatures, photographs and identification cards of authorized users such as, bank employees, travel agency employees and so forth.

In various embodiments of the present invention, the transactions are initiated by generating requests for processing of transactions. In an embodiment of the present invention, transaction processing servers 110 service transaction requests arriving through web server 114 by communicating with transaction channels 104 and other, software applications of system 100. Web server 114 acts as the link between clients, transaction channels 104 and transaction processing servers 110 and forwards messages received via web pages to at least one of transaction channels 104 and transaction processing servers 110.

When a transaction is initiated, transaction channels 104 generate the requests for processing of transactions and the requests are forwarded to transaction processing servers 110. Each request comprises details that are required for completing the initiated transaction. In an exemplary embodiment of the present invention, a request may include details such as, customer name, customer account information, transaction channel information, transaction information and so forth.

In various embodiments of the present invention, each transaction processing server is a data processing unit on which various applications are installed for performing financial and non-financial transactions. Each application is configured to provide banking solutions to customers as well as internal clients. Further, each application comprises executable files for implementing the business solutions and providing one or more banking related services such as internet banking, mobile banking, real-time advisement and account access services, audio/video customer support, co-browsing services, alert notification services etc. Each transaction processing server interacts with an associated repository such as main repository 136, SIS repository 138 and branch repository 140, for completing the requested transaction. In addition, each transaction processing server comprises one or more listener processes or applications configured to transmit and receive details from other transaction processing servers. In various embodiments of the present invention, details related to transactions performed at various transaction processing servers are forwarded to other transaction processing servers at predetermined time intervals through a Store and Forward (SAF) replay service which in turn helps in playing back the transactions performed. In various embodiments of the present invention, the SAF replay service is initiated whenever the connection between two or more transaction processing servers is restored after a temporary disruption of service. For example, disruption of services may happen during scheduled Beginning of Day (BOD)/End of Day (EOD) procedures or whenever there is an unscheduled shutdown. In another example, disruption of services may happen when there is a scheduled or unscheduled shutdown of services.

In an embodiment of the present invention, each transaction processing server is configured to route messages to an alternate Internet Protocol (IP) address and connection port, when connection port along with primary IP address is not able to service the request. The monitor tries sending the message to the alternate IP address, if the server is capable of handling duplicate messages. In an embodiment of the present invention, if the server is not capable of handling duplicate messages, the monitor of the server may be configured for handling duplicate messages. The alternate IP address is used till no connectivity issues are encountered. In case of connectivity issues, the messages are routed back to the primary IP address. It would be apparent that this helps in building redundancy of the same server component on multiple physical machines to increase reliability of the service.

In an embodiment of the present invention, transaction processing servers 110 comprises Main Server 122, Stand-In Server 128, Branch Server 130, a Flexible Stand-In Server (FSIS) 132 and a Local Stand-In Server (LSIS) 134. It will be apparent that the number of transaction processing servers need not be limited to the number of transaction processing servers illustrated in FIG. 1.

Main Server 122 is the key transaction processing server where the critical application for processing various transactions is installed. In various embodiments of the present invention, Main Server 122 interacts with an associated repository i.e. main repository 136, which is configured to store details of customers. In an embodiment of the present invention, main repository 136 acts as the central repository for storing details of all customers and transactions. The data stored at main repository 136 is fetched by Main Server 122 to process various financial, and non-financial transactions. Main repository 136 is updated whenever an operation in the central application is performed or whenever there is a transaction from transaction channels 104. In the event, when Main Server 122 is not available, main repository 136 is updated as and when the Main Server 122 becomes available. Main Server 122 sends the transaction details to other transaction processing servers. In an embodiment of the present invention, Main Server 122 sends the transaction details to SIS 128 at predetermined time intervals. In another embodiment of the present invention, Main Server 122 sends the transaction details to Branch Server 130 at predetermined time intervals.

Main Server 122 may be unavailable due to one of a planned shutdown or an unplanned shutdown due to unforeseen circumstances such as network link failures. In an embodiment of the present invention, the planned shutdown may happen during the EOD/BOD procedures. In the absence of Main Server 122 or when Main Server 122 is unable to service requests, SIS 128, a transaction processing server similar in configuration and functionality, handles the requests. In an exemplary embodiment of the present invention, SIS 128 comprises components for provisioning various functionalities such as checking/updating account balance, risk handling, data maintenance etc. In an embodiment of the present invention, SIS 128 is configured to support automatic streaming of data from main repository 136, which minimizes delays occurring due to unavailability of Main Server 122. The abovementioned functionalities of SIS 128 are illustrative and the number of functionalities that SIS 128 offers need not be limited to those stated above. Further, numerous modifications to these functionalities will be apparent to those skilled in the art.

SIS 128 processes requests by interacting with SIS repository 138 and applying predetermined logic similar to that of Main Server 122. The data in SIS repository 138 is refreshed periodically from main, repository 136. Further, SIS 128 comprises a 'replication send service' that enables fetching of records updated or added in main repository 136 and transmittal of the gathered information to a listening process on SIS 128.

In an embodiment of the present invention, SIS repository 138 is configured based on the storage requirements of the commercial organizations: Once the transactions are completed, SIS 128 transmits the corresponding transaction details to Main Server 122, whenever Main Server 122 becomes available. The synchronization of information between SIS 128 and Main Server 122 is performed based on predetermined criteria at predetermined time intervals. Further, the data in SIS 128 is synchronized with the data in other transaction processing servers such as FSIS 132, LSIS 134 based on predetermined criteria at predetermined time intervals.

In various embodiments of the present invention, Main Server 122 and SIS 128 are centrally located and are configured to process requests from various local/regional branches. In addition, Main Server 122 and SIS 128 are configured to process requests from various transaction channels 104. For example, the transactions may be initiated at one of, but not limited to, banks; internet banking portals; portals provided by online service providers working along with banks such as online travel agency portals, insurance service portals and shopping portals. In other words, the transactions may be initiated at various locations that permit performing various transactions related to financial services. In an embodiment of the present invention, the transactions are initiated at online/offline sources of accessing various financial services. For example, transactions are initiated at Automated Teller Machines (ATMs), treasury applications, telebanking applications, call center channels, e-banking applications etc. When either of the two transaction processing servers is available, Branch Server 130 forwards the requests received at its end to the available transaction processing server. Branch Server 130 first tries sending the request to Main Server 122 and if it is not available, it sends the request to SIS 128. In various embodiments of the present invention, Branch Server 130 regularly keeps a track of availability of servers such as Main Server 122 and SIS 128 in conjunction with the integration module 106, which is updated by the monitoring module 108. Once the availability is confirmed, Branch Server 130 sends the request to the available transaction processing server for further processing. If in the event both Main Server 122 and SIS 128 are not available, Branch Server 130 handles the requests. Branch Server 130 is the transaction processing server located at a local/regional branch serving as the branch application, which can be accessed via interfaces such as that provided by client 112. In an embodiment of the present invention, Branch Server 130 is configured to handle requests initiated at the local/regional branch.

Branch Server 130 comprises predetermined logic to communicate with Main Server 122 and SIS 128 for serving transaction requests. When the branch is not connected to Main Server 122/SIS 128, Branch Server 130 serves the transaction requests by routing the transaction request to other transaction processing servers such as LSIS 134 and FSIS 132.

LSIS 134 is the transaction processing server installed at a local branch for servicing branch level requests. In an embodiment of the present invention, instead of LSIS 134, FSIS 132 may be deployed, which is configured to service requests for a group of branches. LSIS 134/FSIS 132 comprise processes similar to that of SIS 128 for processing of transaction requests. LSIS 134/FSIS 132 interact with branch repository 140 for processing the transactions. In an exemplary embodiment of the present invention, branch repository 140 comprises details of customers of a local branch when Branch Server 130 works in conjunction with LSIS 134 and comprises details of the group of branches when it works in conjunction with FSIS 132. The details of transactions processed at Branch Server 130 are updated at Main Server 122 and subsequently at SIS 128 at predetermined time intervals, once the network link between Branch Server 130 and Main Server 122 is restored.

In various embodiments of the present invention, the requests for processing of transactions are received at integration module 106, which in turn forwards the requests to transaction processing servers 110. In an embodiment of the present invention, integration module 106 forwards the request for processing to Main Server 122, if it is available. If Main Server 122 is not available, integration module 106 forwards the request to SIS 128. If both Main Server 122 and SIS 128 are not available requests are handled by Branch Server 130 and LSIS 134/FSIS 132. The priority of sending requests to the transaction processing servers need not be limited to the one described above and the logic for routing requests to transaction processing servers may be varied based on service/system requirements.

Integration module 106 is a real-time interface that integrates transaction processing servers 110 with transaction channels 104. In an exemplary embodiment of the present invention, integration module 106 integrates transaction processing servers 110 with various applications provided via the integrator of transaction channels 104.

In an embodiment of the present invention, integration module 106 is a multiplexed, multi-connection, asynchronous interface that is configured to implement load balancing at transaction processing servers 110. Load balancing is a feature which provides for automatically adjusting the number of software processes deployed by a system for servicing requests received by the system, wherein the adjustment is performed based on the number of requests. In an embodiment of the present invention, a system administrator may pre-specify a maximum and minimum number of services to be brought up for supporting service requests that should be maintained by integration module 106 at any point in time, while configuring integration module. Accordingly, integration module 106 keeps on adding services required for servicing the requests as number of requests to integration module 106 increases. Once the service load is reduced, extra services are dropped automatically by integration module 106.

In an embodiment of the present invention, integrator module 106 comprises an integration application, which, is linked to one or more applications provided by one or more local bank branches using web services. In an embodiment of the present invention, the one or more applications may be CRM, e-banking or other value-added service applications. Accordingly, integration module 106 acts as middleware for real time interface of applications and services of transaction processing servers 110 either with transaction channels 104 or with other applications.

In various embodiments of the present invention, integration module 106 employs a standard messaging architecture for facilitating data transfer between transaction processing servers 110 and transaction channels 104 and other applications. An example of messaging standard that can be used is a Simple Object Access Protocol (SOAP) protocol. In an exemplary embodiment of the present invention, integration module 106 interacts with transaction channels 104 and other applications using an ISO 8583 protocol. ISO 8583 is a framework for creating protocols for exchange of financial transaction messages.

In various embodiments of the present invention, integration module 106 is configured to support Straight-Through-Processing for facilitating efficient data transfer between servers of transaction processing servers 110 and other components of system 100. Straight-Through-Processing is the execution of financial transactions between the applications and clients without any manual intervention. Further, integration module 106 interfaces to 'Op-console' to enable proactive and reactive system administration. Op-console is a messaging service that relays messages from one or more components of system 100 to an event viewer component of an operating system that displays the messages as event logs. In an embodiment of the present invention, a system administrator can view the event logs on a computing device and take appropriate action.

The transaction requests are forwarded for processing by integration module 106 to an appropriate server of transaction processing servers. 110, based on the availability of transaction processing servers 110 and predetermined criteria for sending requests to transaction processing servers 110. The information pertaining to the availability of transaction processing servers 110 is gathered from monitoring module 108.

Monitoring module 108 comprises a set of monitors for gathering information pertaining to the availability of transaction processing servers 110. The monitors are configured to monitor the status of a corresponding transaction processing server at predetermined time intervals. Further, each monitor checks the status of the corresponding transaction processing server externally by sending status check messages. Each monitor is also configured to update the status of the corresponding transaction processing server to online/offline depending on its availability and transmit the status to other monitors of monitoring module 108 and integration module 106 at predetermined time intervals. This enables accurate estimation of the status of the transaction processing servers.

In various embodiments of the present invention, the set of monitors are one of, but not limited to, a Main Server monitor 116, a stand-in server monitor 118 and a Branch Server monitor 120. It will be apparent that the number of monitors need not be limited to that stated above and may be varied based on the number of servers: Further, more than one monitor may be used for monitoring each server. Alternately, a single monitor may be used to monitor multiple servers.

Main Server monitor 116 is configured to monitor and update the status of a Main Server 122. In an embodiment of the present invention, Main Server monitor 116 comprises a connect monitor 124 and a check monitor 126. Connect monitor 124 is configured to listen to the requests sent by Main Server 122 for updating the status of Main Server 122 at integration module 106. In an exemplary embodiment of the present invention, the status of Main Server 122 at integration module 106 is changed to offline, when Main Server 122 informs connect monitor 124 of a planned shutdown/downtime. In another exemplary embodiment of the present invention, the status is changed to online, when Main Server 122 informs connect monitor 124 of a planned restart/uptime, which in turn sends messages to other monitors of monitoring module 108 and integration module 106.

In various embodiments of the present invention, connect monitor 124 triggers playback of transactions to Main Server 122, whenever Main Server 122 is available. The playback is performed for transactions serviced by other transaction processing servers in the absence of Main Server 122. In an embodiment of the present invention, connect monitor 124 triggers a message to SIS 128 for initiating the SAF replay service for playing back the transactions performed.

Check monitor 126 is configured to check the availability of Main Server 122 at predetermined time intervals by sending messages to Main Server 122. In an exemplary embodiment of the present invention, check monitor 126 is configured to handle messages during BOD/EOD procedures.

Stand-in server (SIS) monitor 118 is similar to Main Server monitor 116 and is configured to gather information pertaining to the status of a Stand-in Server 128. SIS monitor 118 is configured to update the status of SIS 128 in a similar manner at integration module 106. SIS monitor 118 is further configured to monitor the status of a SAF replay by checking a SAF table and facilitate initiation of SAF by bringing up the SAF replay process.

Similarly, Branch Server monitor 120 is configured to monitor and update the status of a Branch Server 130 at integration module 106. Accordingly, Branch Server monitor 120 comprises listener processes configured to listen to requests sent by Branch Server 130 for updating the status of Branch Server 130 at integration module 106 to online/offline. Branch Server monitor 120 is also configured to trigger playback of transactions performed in the absence of Branch Server 130, once it is available for processing of transactions. The SAF replay service may be initiated by Branch Server monitor 120 to playback the transactions processed by LSIS 134/FSIS 132 servers to Main Server 122.

Figure 2:
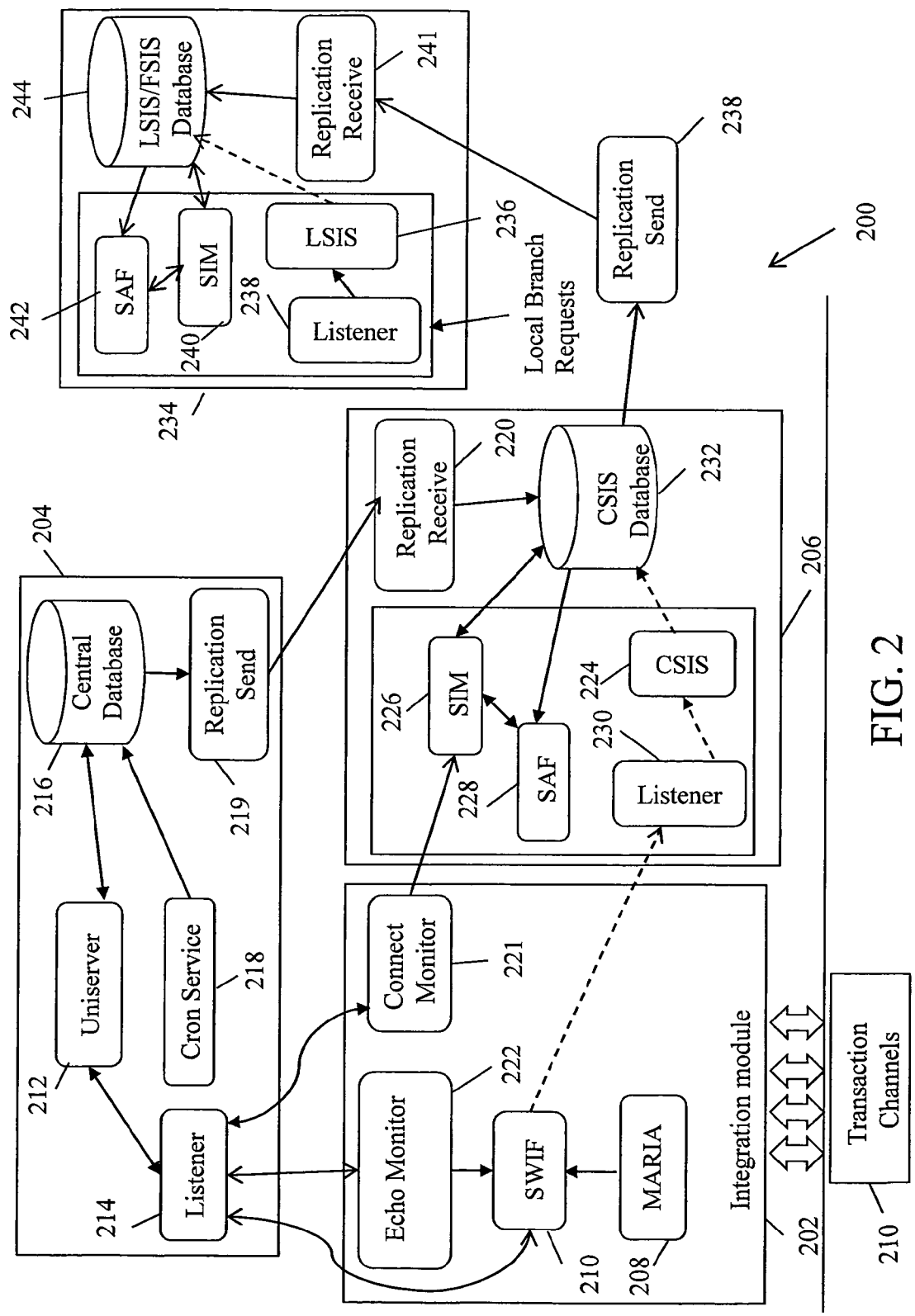
FIG. 2 illustrates messaging between one or more modules of the system for facilitating non-interruptive transactions, in accordance with an embodiment of the present invention.

FIG. 2 illustrates messaging between one or more modules of the system for facilitating non-interruptive transactions. In an embodiment of the present invention, a standard based messaging architecture is implemented for providing non-interruptive transactions. Further, various applications are executed by software components of the transaction processing servers for facilitating non-interruptive transactions. For example, one or more listener processes that accept connections from external applications and service the messages are executed at one or more transaction processing servers.

In an embodiment of the present invention, a monitor or controller server component is configured to bring up and maintain a minimum number of listener processes. The monitor is further configured to bring up to a maximum number of additional listener processes, which can be configured based on system/service requirements. Typically, each listener process services one connection from a port. Further, the number of client connections corresponds to the number of server processes. Accordingly, an increase in the number of client connections leads to an increase in the number of server processes brought up by the monitor process.

Integration module 202 acts as the middleware and supports transfer of messages between various applications running on Main Server 204 and other components. In an embodiment of the present invention, integration module 202 employs Multiple Asynchronous Request Interface Adapter (MARIA) 208 and Switch Interface (SWIF) 210 for transfer of messages.

MARIA 208 is a generic listener process that lists Transaction Channel Controllers (TCCs) for various types of transaction requests. Further, MARIA 208 handles connection pooling and queuing of messages from one or more clients. MARIA 208 may receive messages requesting access to listener service processes from transaction channels 210.

MARIA 208 is also configured to distribute load within existing listener service processes on Main Server 204 or other transaction processing servers such as Central Stand-In Server (CSIS). Further, MARIA 208 is configured to bring up additional processes, if all the running processes are busy. In an exemplary embodiment of the present invention, MARIA 208 implements load balancing in a manner similar to that implemented by integration module 202.

SWIF 210 is an application interface between integration module 202 and other modules/systems such as Main Server 204 and CSIS 206. In an exemplary embodiment of the present invention, SWIF is developed based on the Listener Server (LISRVR) architecture and is configured to handle availability and scalability issues of system 100. LISRVR comprises common applications which are used for providing various services such as SWIF, Uniserver, Monitors etc. Further, the minimum and maximum number of services for supporting exchange of messages may also be configured. In addition, the minimum number of services that should be initiated, when the system is started may also be configured based on the number of requests. Thereafter, the number of services may be brought upto maximum number of services. Based on the load, extra services may be dropped automatically and the LISRVR application may be configured to ensure that a minimum number of instances are available at any point.

SWIF uses shared memory to determine whether the Main Server is available or not. If Main Server is not available, SWIF immediately sends the request to CSIS for processing, and once the Main Server is available, the status in shared memory is updated to connect to Main Server.

SWIF 210 receives messages from MARIA 208 and delivers the messages to a uniserver process 212 at Main Server 204 through a listener process 214. Uniserver 212 handles business functionality of messages delivered by integration module 202. Subsequently, uniserver 212 sends a response to SWIF 210 after the transaction is processed based on the message. For processing transactions, uniserver 212 interacts with a central database 216 which stores customer transactional data and customer profiles.

In an embodiment of the present invention, Main Server 204 comprises a continuously running cron service 218, which is configured to maintain contra entry records of cash withdrawals from ATMs. In an exemplary embodiment of the present invention, the contra entry legs are maintained based on predefined parameter values. The parameters are monitored via cron service 218, which is configured to automatically create contra entry records when preconfigured parameter values are reached.

In an embodiment of the present invention, a Replication Send service 219 runs at Main Server 204. Replication Send service 219 is configured to identify change in data at Main Server 204 and forward the identified changes to a listener process 230 at CSIS 206, which is configured to act as the transaction processing server in the absence of Main Server 204. In addition, SWIF 210 delivers messages to CSIS 206, when Main Server 204 is not available. CSIS 206 comprises a replication receive process 220, which is configured to listen to Replication Send service 219. Replication receive process 220 is further configured to maintain and update data at a CSIS database 232.

In various embodiments of the present invention, integration module 202 implements one or more monitors or controller processes such as a connect monitor 221 and an echo monitor 222 for monitoring status of uniserver 212 and maintaining a corresponding ONLINE/OFFLINE status flag at integration module 202. The ONLINE/OFFLINE status flag indicates the availability status of uniserver 212 of Main Server 204.

When Main Server 204 is available for processing transaction requests from a local branch, the requests are processed by uniserver 212. In addition, all transaction requests at local branches are forwarded to uniserver 212 for processing. In an exemplary embodiment of the present invention, uniserver 212 intimates a planned shutdown by sending a message to connect monitor 221, which changes the flag at integration module 202 to OFFLINE. Subsequently, all requests received by integration module 202 are forwarded to CSIS 206 till an ONLINE message is received from uniserver 212.

In various embodiments of the present invention, CSIS 206 implements one or more processes for facilitating non-interruptive transaction; the processes comprise a Central stand-in service 224, a Stand-in Monitor (SIM) 226, a Store and Forward (SAF) 228 and a listener 220. SIM 226 is configured to receive status change messages from connect monitor 221 and accordingly update the status of various processes of CSIS 206. When Main Server 204 is unavailable, echo monitor 222 updates the status of SWIF 210 and also checks for availability of uniserver 212 at predetermined time intervals. Further, the messages received from SWIF 210 are forwarded to listener 220 of CSIS 206 and the corresponding transaction requests are processed and served by central stand-in service 224, which uses application logic similar to that of uniserver 212 for processing transaction requests. Further, central stand-in service 224 uses data in CSIS database 232 for processing requests. In various embodiments of the present invention, data in CSIS database 232 is refreshed periodically via Replication Send service 219 and replication receive process 220.

SAF 228 is configured to store transaction data when requests are processed at CSIS 206. In an embodiment of the present invention, SAF 228 maintains a SAF table for storing customer transaction data, when requests are processed at CSIS 206. The data stored in the SAF table is communicated to Main Server 204, when a SAF replay process is invoked. The SAF replay process updates uniserver 212 and central database 216 with details stored in the SAF table and is invoked by connect monitor 221, when Main Server 204 becomes available for processing transaction requests. In an embodiment of the present invention, the SAF replay process is initiated when an unscheduled shutdown of Main Server 204 occurs.

A similar logic is applied, when requests are processed at a Local Stand-in Server 234, which is installed at a local branch for servicing branch level requests, when Main Server 204 and CSIS 206 are not available. In an embodiment of the present invention, instead of a local stand-in server 234, a Flexi Stand-In Server may be deployed which is configured to service requests for a group of branches. Further, LSIS 234 also comprises processes similar to that of CSIS 206 for processing of transaction requests. In an embodiment of the present invention, the processes implemented at LSIS 234 comprise a local stand-in service 236, a listener process 238, a SIM 240 and SAF service 242.

SIM 240 is configured to handle change of status of various processes running at LSIS 234, when Main Server 204 and CSIS 206 are unavailable. Local stand-in service 226 interacts with an LSIS/FSIS database 244 for processing of requests. Further, LSIS/FSIS database 244 is refreshed at predetermined time intervals by the CSIS Database 222 through replication send service 238 and a replication receive service 241 based on the availability of Main Server 204 and CSIS 206. In addition, SIM 240 monitors the SAF table maintained by SAF process 242 and once Main Server 204 and CSIS 206 are available, SIM 240 invokes the SAF replay process for synchronizing information between LSIS/FSIS database 244 and central database 216 and CSIS database 232.

Figure 3:
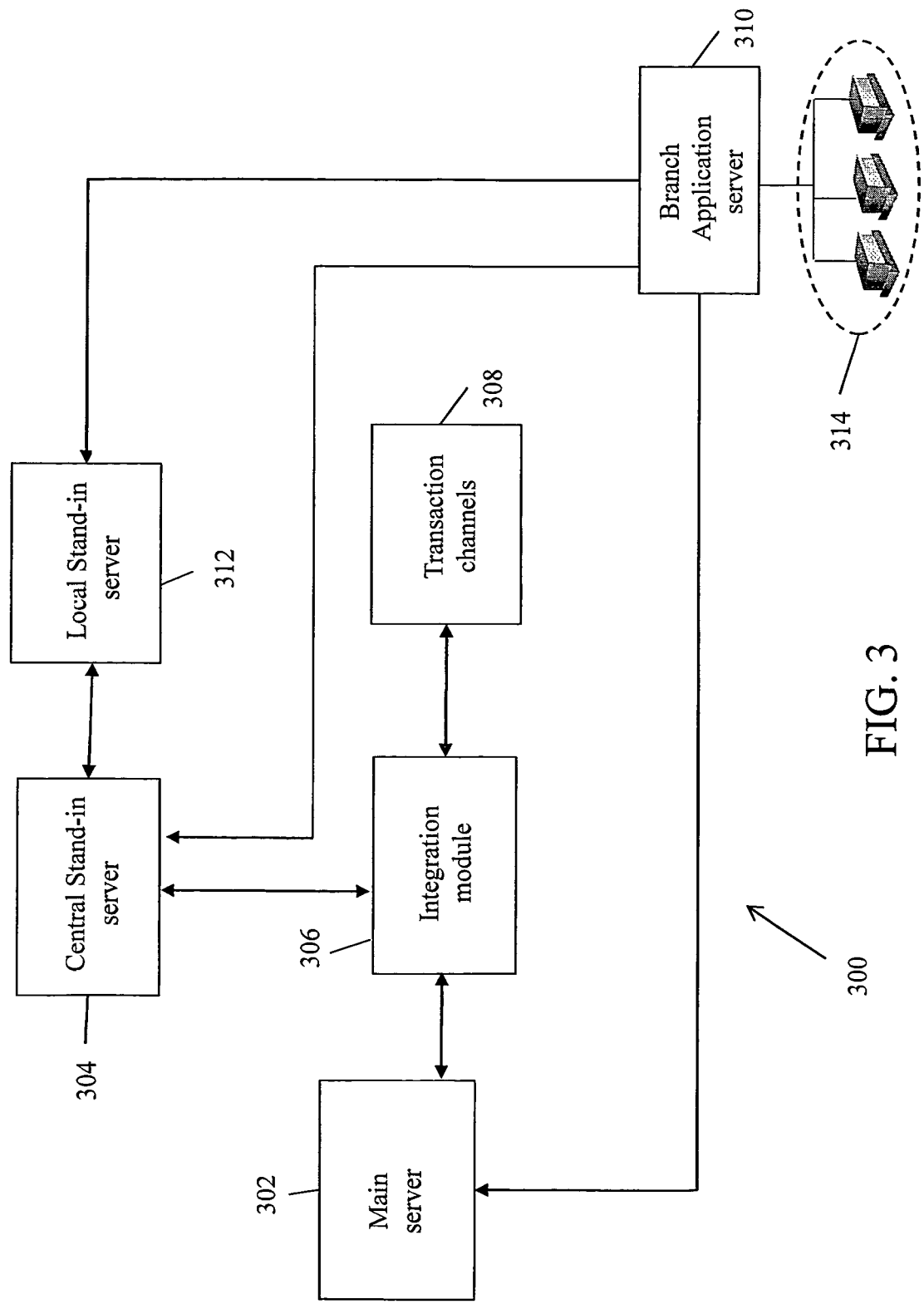
FIG. 3 illustrates interactions between one or more modules of the system for facilitating non-interruptive transactions, in accordance with an embodiment of the present invention.

FIG. 3 illustrates interactions between one or more modules of the system for facilitating non-interruptive transactions, in accordance with an embodiment of the present invention.

As illustrated, system 300 comprises a Main Server 302, a Central Stand-In Server (CSIS) 304 and an Integration Module 306. Main Server 302 is configured to accept requests from client computers at a central facility and from a Branch Application Server 310, wherein Branch Application Server 310 is the primary application server at a local branch and is connected to both Main Server 302 and CSIS 304.

Central stand-in server 304 is configured to operate in a CONNECTED mode or in a NONCONNECTED mode. When CSIS 304 functions in a CONNECTED mode, Main Server 302 may hand over control to CSIS 304 in a planned manner during EOD/BOD or when Main Server 302 needs to be shutdown for maintenance, wherein CSIS 304 functions similar to Main Server 302. Further, CSIS 304 accepts requests from Transaction Channels 308 through Integration Module 306. In an exemplary embodiment of the present invention, CSIS 304 accepts messages in an internal application-required format.

In various embodiments of the present invention, a Local Stand-In Server (LSIS) 312 at a local branch is configured to service branch application requests, when Main Server 302 and CSIS 304 are unavailable. LSIS 312 comprises similar processes to that of CSIS 304 and listens to transaction requests from the local branch. Further, the transaction requests may be received from one or more clients 314 directly at Branch Application Server 310 or via Integration Module 306. In addition, Branch Application Server 310 may handle messages differently than Transaction Channels 308. In an exemplary embodiment of the present invention, LSIS 312 accepts messages in an internal application-required format. In various embodiments of the present invention, a Flexi. Stand-in Server (not shown in the figure) processes requests from a predetermined group of branches, when Main Server 302 and CSIS 304 are not available. The FSIS is similar in configuration and functionality to CSIS 304 and LSIS 312.

In various embodiments of the present invention, LSIS 312 comprises complete and accurate information of customer account balances and transactions, which is received from CSIS 304, and authorizes transaction requests based on the available account data. In an exemplary embodiment of the present invention, requests processed at LSIS 312 are stored in a SAF table. The stored messages are forwarded to Main Server 302 when it is available. Further, Main Server 302 performs actual transaction creation/processing of unprocessed messages after receipt of SAF replay.

In various embodiments of the present invention, system 300 is configured to switch back to CONNECTED mode of operation, as soon as Main Server 302 and CSIS 304 are available. In a NONCONNECTED mode, a daemon (Monitor) program of LSIS 312 constantly interacts with Main Server 302 for access to uniserver process. As soon as Main Server 302 becomes available, the daemon program automatically invokes the SAF replay process and data stored in the SAF table is updated at Main Server 302. Also, Integration Module 306 first attempts to receive authorization from Uniserver before sending any message to LSIS 312, before processing any request, thereby ensuring that authorization is provided by Main Server 302 instead of LSIS 312.

Figure 4:
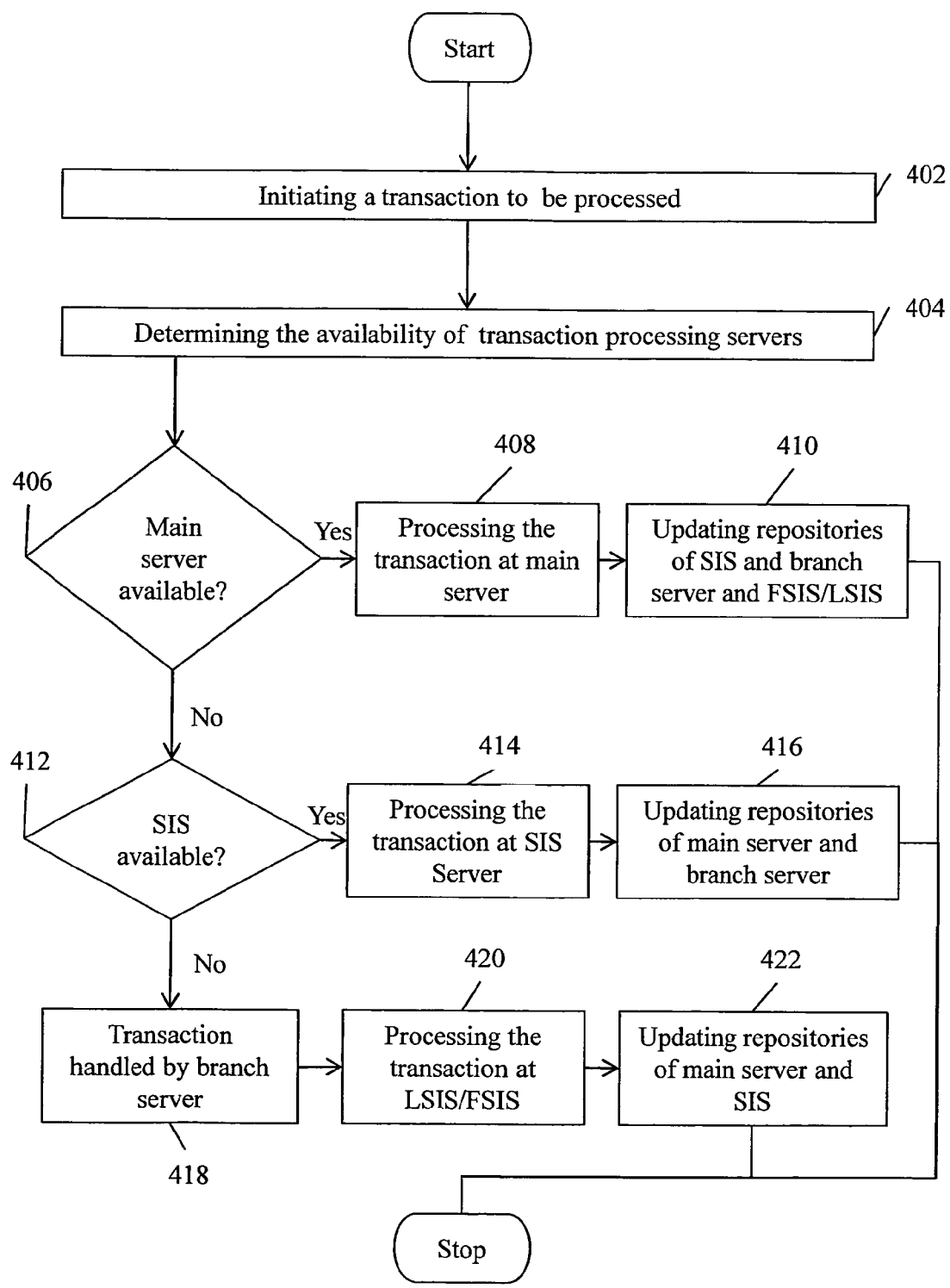
FIG. 4 illustrates a flowchart of a method for facilitating non-interruptive transactions, in accordance with an embodiment of the present invention.

FIG. 4 illustrates a flowchart of a method for facilitating transactions, in accordance with an embodiment of the present invention.

At step 402, a transaction is initiated at a transaction channel. The transactions are initiated by customers, authorized users such as bank employees and so forth. In addition, the transactions are initiated either at a transaction channel or via an input module that provides an interface for initiating transactions at various transaction channels. In various embodiments of the present invention, the transactions can be performed after logging in through a Single Sign-On (SSO) framework and a Signature Verification System (SVS). In various embodiments of the present invention, a transaction processing request is generated, when a transaction is initiated.

At step 404, the availability of one or more transaction processing servers for processing of transactions is determined. In various embodiments of the present invention, availability information of each transaction processing server is gathered from one or more monitors. Based on the availability information, the transaction request is forwarded to a transaction processing server based on predetermined criteria. In addition, the status of each server is tracked via an integration module and a SWIF and/or branch application direct the requests based on the status. This status update is managed by the monitors, thereby eliminating requirement of any manual intervention.

At step 406, the status of a Main Server is checked from the gathered availability information. Alternately, it is determined from the tracked status obtained from the monitors or integration module, whether the Main Server is available for processing of the initiated transaction. If the Main Server is available, then the transaction initiated at the transaction channel is forwarded for processing to the Main Server.

At step 408, the Main Server processes the transaction. The Main Server identifies requisite details for completion of the transaction from a repository, i.e. a central repository which stores details corresponding to the customers of commercial organizations. The processing of the transaction comprises checking whether the requested transaction can be performed or not. If the transaction can be performed, the Main Server processes the request and then updates the repository with transaction details. Alternately, the Main Server notifies the reasons why the transaction can not be performed to the transaction channel, which in turn notifies the customer.

At step 410, the data in the central repository is synchronized with the data in repositories of other transactions processing servers. In various embodiments of the present invention, synchronization of data is performed based on predetermined criteria at predetermined time intervals.

If the Main Server is not available for processing of requests, the request is forwarded to another transaction processing server based on availability and predetermined criteria. The status of transaction processing servers is tracked via monitors or the integration module. Accordingly the SWIF and/or branch application forward requests to another transaction processing server, until a status change message related to the Main Server is received from at least one monitor.

At step 412, the status of a Stand-In Server (SIS) is checked. In various embodiments of the present invention, the status is gathered from the integration module. In an embodiment of the present invention, the integration module receives real-time status update from the monitor for serving requests related to status update. If the SIS is available, then the transaction initiated at the transaction channel is forwarded for processing to the SIS.

At step 414, the SIS processes the transaction. In an embodiment of the present invention, the SIS identifies requisite details for completion of the transaction from a SIS repository, i.e. the repository associated with the SIS which stores details corresponding to the customers of commercial organizations. In various embodiments of the present invention, the SIS repository comprises a subset of the details stored in the repository of the Main Server and is updated at predetermined time intervals based on predetermined criteria.

At step 416, the data in the SIS repository is synchronized with the data in repositories of other transaction processing servers based on their availability. In an embodiment of the present invention, the data in the SIS repository is synchronized with the repository of the Main Server, as and when the Main Server is available. Thereafter, the data of the Main Server is synchronized with repositories of other transaction processing servers based on predetermined criteria and at predetermined time intervals.

If both the Main Server and the SIS are not available for processing transaction requests, the request is forwarded for processing to a Branch Server. At step 418, the request is handled by the Branch Server, which works in conjunction with one of a Flexible Stand-In Server (FSIS) and a Local Stand-In Server (LSIS). In an embodiment of the present invention, the Branch Server is similar to the Main Server and is configured to serve requests pertaining to a branch or a set of branches. In an embodiment of the present invention, the status of Main Server and SIS is checked at predetermined intervals. In another embodiment of the present invention, the control is transferred back either to the Main Server or the SIS based on their availability. In another embodiment of the present invention, the Branch Server remains in communication with the LSIS/FSIS, until a status change message related to Main Server or SIS is received.

Branch server forwards the request to the FSIS/LSIS. At step 420, the FSIS/LSIS processes the transaction. In an embodiment of the present invention, the FSIS/LSIS identifies requisite details for completion of the transaction from the branch repository, i.e. the repository associated with the branch/group of branches which store details corresponding to the customers of the branch/group of branches. In various embodiments of the present invention, the branch repository is updated at predetermined time intervals based on predetermined criteria by the Main Server or SIS.

At step 422, the data in the Branch Server repository is synchronized with the data in repositories of other transactions processing servers. In an embodiment of the present invention, the data in the Branch Server repository is synchronized with the central repository, as and when the Main Server is available. Thereafter, the data in the central repository is synchronized with repositories of other transaction processing servers based on predetermined criteria and at predetermined time intervals.

It will be apparent that the priority of sending requests to the transaction processing servers need not be limited to the one described above and the logic for routing requests to transaction processing servers may be varied. Further, the status of transaction processing servers need not be checked everytime for forwarding requests to transaction processing servers, wherein the availability status tracked via the monitors may be used to automatically forward requests to transaction processing servers.

While the exemplary embodiments of the present invention are described and illustrated herein, it will be appreciated that they are merely illustrative. It will be understood by those skilled in the art that various modifications in form and detail may be made therein without departing from or offending the spirit and scope of the present invention as defined by the appended claims.

What is claimed is:

1. A system for facilitating non-interruptive transactions, via at least one processor configured to execute program instructions stored in at least one memory, the transactions being initiated at one or more transaction channels, the system comprising:
    a plurality of transaction processing servers configured to perform transactions initiated at the transaction channels, each of the plurality of transaction processing servers comprising predetermined logic for performing the initiated transactions;
    one or more monitors in communication with a first processor and configured to monitor the availability of the transaction processing servers and forward the availability information to an integration module; and
    the integration module in communication with a second processor and configured to forward the transactions initiated at the transaction channels to at least one transaction processing server based on the received availability information and a predetermined criteria for forwarding transactions for processing to at least one other corresponding transaction processing server of the plurality of transaction servers,
    wherein each monitor is further configured to trigger initiation of a store and forward replay process for synchronizing information between the at least one transaction processing server and the at least one other corresponding transaction processing server, the replay process being initiated upon restoration of network link between the corresponding transaction processing servers.

2. The system of claim 1 further comprising an input module configured to collect inputs pertaining to initiation of transactions at the transaction channels of at least one branch, the input module comprising:
    a client configured to;
    render an interface for enabling the collection of inputs; and
    provide one or more web services via the rendered interface; and
    a web server configured to enable provisioning of the interface and the web services via the client.

3. The system of claim 1 further comprises:
    a Single Sign-On (SSO) framework configured to enable a single login id and password based access to a plurality of web services; and
    a Signature Verification System (SVS) configured to enable validation of login credentials pertaining to predefined formats.

4. The system of claim 1, wherein each transaction channel comprises at least one transaction initiation interface configured to collect inputs pertaining to initiation of transactions.

5. The system of claim 1, wherein each transaction processing server is at least one of:
    a Main Server configured to perform transactions initiated at the transaction channels;
    a Stand-In Server (SIS) configured to perform transactions initiated at the transaction channels in the absence of the Main Server;
    a Branch Server configured to handle transactions initiated at transaction channels of one or more branches in the absence of the Main Server and the SIS;
    a Branch Stand-In Server (BSIS) configured to work in conjunction with the Branch Server and to process transactions initiated at the transaction channels of the one or more branches, in the absence of the Main Server and the SIS.

6. The system of claim 5, wherein the Branch Server is configured to forward transactions initiated at the transaction channels of the one or more branches to at least one of the Main Server and the SIS, the transactions being forwarded if the at least one of the Main Server and the SIS is available for performing transactions.

7. The system of claim 5, wherein the BSIS is a Flexible Stand-In Server (FSIS) configured to perform transactions initiated at transactions channels of a predetermined set of branches.

8. The system of claim 5, wherein the BSIS is a Local Stand-In Server (LSIS) configured to perform transactions initiated at transactions channels of a branch.

9. The system of claim 5, wherein each transaction processing server is associated with a repository configured to store transaction related information, the transaction processing server configured to interact with the repository for performing transactions.

10. The system of claim 5, wherein each transaction processing server is configured to forward details of transactions performed at the transaction processing server to at least one other transaction processing server at predetermined time intervals based on predetermined criteria.

11. The system of claim 1, wherein the integration module is further configured to act as a middleware and provide a real-time interface between the transaction channels and the monitoring module and the transaction processing servers.

12. The system of claim 11, wherein the integration module is further configured to enable interaction between the transaction channels and the monitoring module and the transaction processing servers.

13. The system of claim 11, wherein the integration module comprises one or more listener processes and interfacing components for enabling interaction between the transaction channels and the monitoring module and the transaction processing servers.

14. The system of claim 13 further comprising a Multiple Asynchronous Request Interface Adaptor (MARIA) configured to manage the one or more listener processes.

15. The system of claim 13 further comprising a Switch Interface (SWIF) configured to act as an interfacing component between the transaction channels and the monitoring module and the transaction processing servers.

16. The system of claim 1, wherein the monitoring module comprises one or more monitors, each monitor being configured to monitor the availability of at least one transaction processing server and transmit the availability information to the integration module.

17. The system of claim 16, wherein each monitor is further configured to listen to status change requests from the transaction processing server and forward the status change information to the integration module.

18. The system of claim 16, wherein each monitor is further configured to monitor the availability of the transaction processing server at predetermined time intervals by sending predetermined messages to the transaction processing server.

19. The system of claim 16, wherein the one or more monitors comprise:
 a Main Server monitor configured to monitor the availability of a Main Server;
 a Stand-In Server (SIS) monitor configured to monitor the availability of a SIS; and
 a Branch Server monitor configured to monitor the availability of a Branch Server.

20. A system for facilitating non-interruptive transactions, via at least one processor configured to execute program instructions stored in at least one memory, the transactions being initiated at one or more transaction channels, the system comprising:
 a plurality of transaction processing servers configured to perform transactions initiated at the transaction channels, each transaction processing serer comprising predetermined logic for performing the initiated transactions, the plurality of transaction processing servers comprising:
  one or more primary transaction processing servers configured to perform the initiated transactions based on predetermined criteria; and
  one or more stand-in transaction processing servers, each stand-in transaction processing server configured to act as at least one primary transaction processing server in the absence of the corresponding transaction processing server;
 one or more monitors in communication with a first processor and configured to monitor the availability of the transaction processing servers and forward the availability information to an integration module; and
 the integration module in communication with a second processor and configured to forward the transactions to at least one transaction processing server based on the received availability information and a predetermined criteria for forwarding requests to at least one other corresponding transaction processing server, wherein each monitor is further configured to trigger initiation of a store and forward replay process for synchronizing information between the at least one transaction processing server and the at least one other corresponding transaction processing server, the replay process being initiated upon restoration of network link between the corresponding transaction processing servers.

21. A method for facilitating non-interruptive transactions, via at least one processor configured to execute program instructions stored in at least one memory, the method comprising:
 receiving at least one transaction processing request from at least one transaction channel;
 tracking, via a first processor, the availability of one or more primary transaction processing servers and one or more stand-in transaction processing servers; and
 forwarding, via a second processor, the transaction processing request to at least one transaction processing server based on the availability information and a predetermined criteria for forwarding requests to at least one other corresponding transaction processing server;
 synchronizing, via the first processor, information between the at least one transaction processing server and the at least one other corresponding transaction processing server upon restoration of network link between the corresponding transaction processing servers.

22. A method for facilitating non-interruptive transactions via at least one processor configured to execute program instructions stored in at least one memory, the method comprising:
 receiving at least one transaction processing request from at least one transaction channel;
 tracking, via a first processor, the availability of a plurality of transaction processing servers, the plurality of transaction processing servers comprising a Main Server, a Stand-In Server (SIS), a Branch Server and a Branch Stand-In Server (BSIS);

forwarding, via a second processor, the transaction processing request to at least one transaction processing server based on the availability information and a predetermined criteria for forwarding requests to at least one other corresponding transaction processing servers of the plurality of transaction processing servers; and synchronizing, via the first processor, information between the at least one transaction processing server and the at least one other corresponding transaction processing server upon restoration of network link between the corresponding transaction processing servers.

23. The method of claim 22, wherein the transaction processing request is forwarded for processing to:
the Main Server, if it is available;
the SIS, if the Main Server is not available; and
the Branch Server, if the Main Server and the SIS are not available, wherein the Branch Server works in conjunction with the BSIS for processing the request.

24. The method of claim 22, wherein the availability of the transaction processing servers is tracked by one or more monitors.

25. The method of claim 24, wherein the transaction processing request is automatically forwarded to at least one transaction processing server by at least one of a Switch Interface and a branch application module, the transaction processing request being forwarded based on the information gathered from the monitors and the predetermined criteria for forwarding requests.

26. A computer program product comprising:
a non-transitory computer-readable medium having computer-readable program code stored thereon, the computer-readable program code comprising instructions, that when executed by one or more processors, cause the one or more processors to:
receive at least one transaction processing request from at least one transaction channel;
track the availability of a plurality of transaction processing servers;
forward the transaction processing request to at least one transaction processing server based on the availability information and a predetermined criteria for forwarding requests to at least one other corresponding transaction processing servers; and
synchronize information between the at least one transaction processing server and the at least one other corresponding transaction processing server upon restoration of network link between the corresponding transaction processing servers.

27. The computer program product of claim 26 further comprising the computer-readable program code comprising instructions, that when executed by the one or more processors, cause the one or more processors to forward the transaction processing request for processing to:
the Main Server, if it is available;
the SIS, if the Main Server is not available; and
the Branch Server, if the Main Server and the SIS are not available, wherein the Branch Server works in conjunction with the BSIS for processing the request.

28. The computer program product of claim 26 further comprising computer-readable program code comprising instructions, that when executed by the one or more processors, cause the one or more processors to track the availability of the transaction processing servers via one or more monitors.

29. The computer program product of claim 28 further comprising computer-readable program code comprising instructions that when executed by the one or more processors, cause the one or more processors to automatically forward the transaction processing request to at least one transaction processing server by at least one of a Switch Interface and a branch application module, the transaction processing request being forwarded based on the information gathered from the monitors and the predetermined criteria for forwarding requests.

30. A computer program product comprising:
a non-transitory computer-readable medium having computer-readable program code stored thereon, the computer-readable program code comprising instructions, that when executed by one or more processors, cause the one or more processors to:
receive at least one transaction processing request from at least one transaction channel;
track the availability of a plurality of transaction processing servers, the plurality of transaction processing servers comprising a Main Server, a Stand-In Server (SIS), a Branch Server and a Branch Stand-In Server (BSIS); and
forward the transaction processing request to at least one transaction processing server based on the availability information and a predetermined criteria for forwarding requests to at least one other corresponding transaction processing server; and
synchronize information between the at least one transaction processing server and the at least one other corresponding transaction processing server upon restoration of network link between the corresponding transaction processing servers.

* * * * *